Jan. 17, 1939. A. GROSS 2,143,939
FENDER PROTECTOR
Filed Nov. 4, 1937
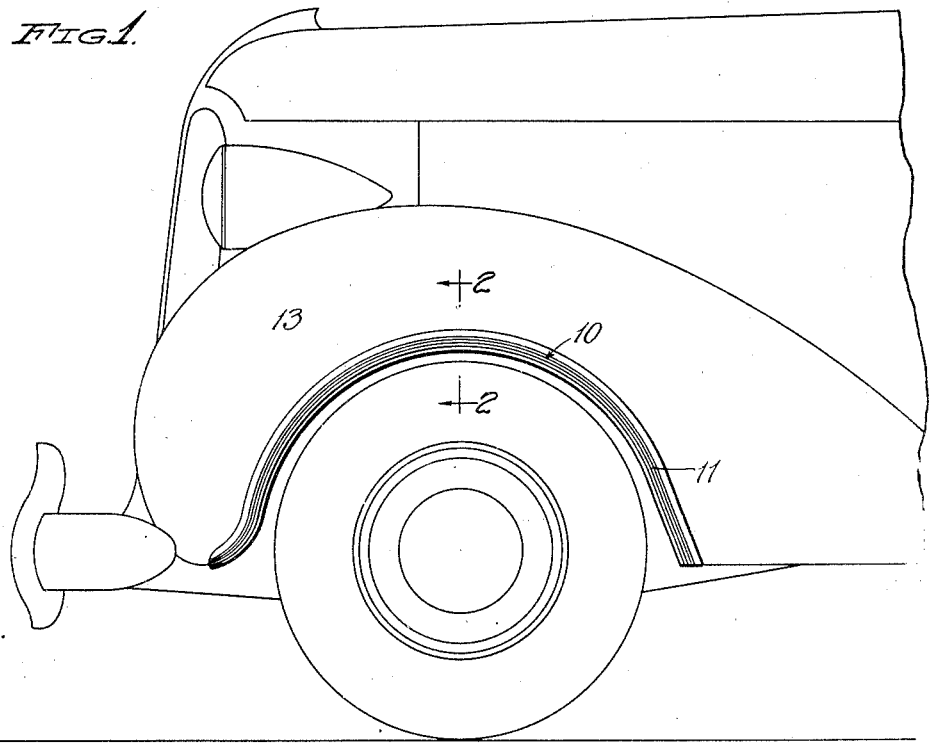
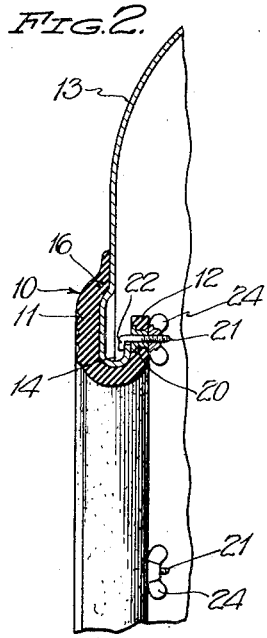
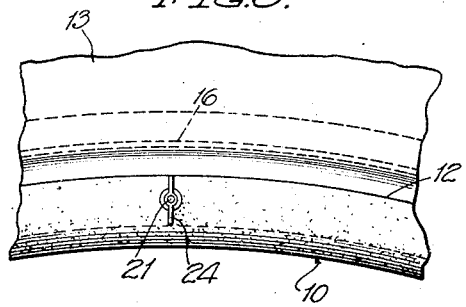
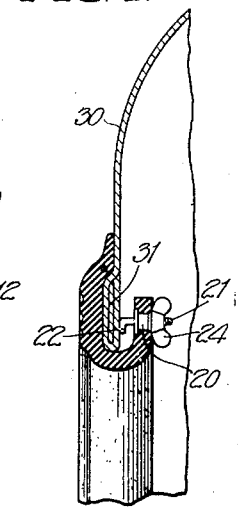
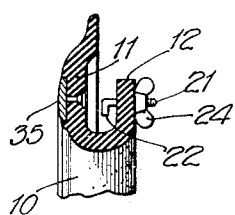
ANDREW GROSS,
INVENTOR.
BY Ely Pattison,
ATTORNEYS.
WITNESS:

Patented Jan. 17, 1939

2,143,939

UNITED STATES PATENT OFFICE 2,143,939

FENDER PROTECTOR

Andrew Gross, New York, N. Y.

Application November 4, 1937, Serial No. 172,704

1 Claim. (Cl. 280—152)

The present invention relates to protectors for the edges of vehicle fenders and similar projecting elements of vehicles.

It is the object of the present invention to provide a protector for absorbing relatively light blows and shocks, particularly such shocks as would ordinarily only mar the finish or at the most, form but a slight distortion of the edge of the element, it not being the intention of the invention to provide a device which will prevent denting or other distortion of vehicle fender or similar projecting element, should it be subjected to a heavy blow or shock.

A feature of the invention resides in the provision of a protecting element which may be attached to or removed from the part to be protected, at will.

Another feature of the invention resides in the provision of a device of the afore-mentioned character which may form, either an element of regular equipment of a vehicle, or may be sold as an accessory therefor.

Still another feature of the invention resides in a novel construction whereby the protector may be so manipulated as to cause it to conform to slight irregularities of, or variations in the contour of the element to which it is to be applied.

Still a further feature of the invention resides in a novel means for securing the device in operative position upon the element or part to be protected.

In the accompanying drawing, I have illustrated the invention as applied to a fender of a motor vehicle, but it is to be understood that this adaptation of the invention is merely an illustration of one manner of use to which the invention may be put and that it may be adapted to use in connection with the edges of vehicle running boards or in fact the edges of any of the projecting elements of vehicle bodies.

For a more comprehensive understanding of the invention, reference will be had to the following specification and claim and to the accompanying drawing, in which;

Figure 1 is a view in side elevation of the forward portion of a motor vehicle, illustrating a front wheel and its fender, with a device constructed in accordance with the present invention, mounted upon the edge of the fender, Figure 2 is a fragmentary detail sectional view on a slightly enlarged scale, the view being taken substantially on the line 2—2 of Figure 1, Figure 3 is a detail fragmentary view in elevation showing the rear or inner face of the fender, Figure 4 is a detail transverse sectional view illustrating another manner of operation of the securing means, and;

Figure 5 is a transverse sectional view illustrating a modified form of the invention.

Referring to the drawing by reference character, and more particularly to Figures 1 to 3, inclusive, the device comprises an elongated body portion 10, of any relatively soft semi-rigid material, one very good example of a desirable material being rubber of substantially the same type and having substantially the same characteristics of the walls and tread portion of the so-called shoes or casings of ordinary pneumatic tires for motor vehicles.

The elongated body portion is provided or formed with a channel which extends throughout or susbtantially throughout the length of the body portion which results in the body portion being of susbtantially U-shaped cross-sectional form, one of the legs of which, however, may be, as shown in the drawing, slightly longer than the other.

The legs above mentioned, really constitute the side walls of the channel and it will be noted that one of these side walls is preferably thicker at its intermediate portion than the other, the thicker wall being designated 11, the thinner wall being designated 12.

In the form illustrated in Figures 1 through 3, the fender which is designated 13, is of the type having a rolled edge 14, and when the protector is employed upon this type of fender, the rolled edge thereof, is positioned in the channel in such a manner that the thicker wall 11 of the protector will be positioned outwardly of the fender as illustrated in Figure 2.

It is to be understood that the protector is molded or otherwise preformed to a shape which conforms generally to the shape of the edge to which it is to be attached and to aid the device to retain its original shape and also to lend a certain degree of rigidity to the outer wall 11, there is, in those forms of the invention illustrated in Figures 1 through 4, a reinforcing element 16, preferably in the form of a length of wire or rod of suitable material of relatively small cross-sectional dimension.

The width of the channel which receives the rolled edge of the fender is or may be, slightly less than the exterior dimension of the rolled edge of the fender, which construction results in a slight gripping of the rolled edge of the fender by the side walls of the channel when the device is placed in position upon the fender.

While the frictional gripping of the fender by the side walls of the channel in the manner above described, may be sufficient to retain the protector in operative position upon the fender, I generally prefer to employ an additional securing means and I will now proceed to describe this additional means and the manner in which it functions in the construction illustrated in Figures 1 to 3 of the drawing.

Mounted at suitably spaced intervals in the wall 12 of the channel, there are bushings 20, through each of which passes a bolt 21. The inner end of the bolt 21 is hooked as at 22 to engage behind the flange of the rolled edge of the fender. The other or outer end of the bolt is threaded to receive a wing nut 24, which bears against the outer end of the bushing 20. When the wing nut 24 is tightened up, the hooked end of the bolt 21 is drawn into engagement with the flange of the rolled edge of the fender and the said flange, together with the side wall 12 of the channel, are firmly gripped between the hooked end 22 of the bolt 21 and the wing nut 24.

In that form of the invention illustrated in Figure 4, the protector is shown applied to a fender 30, having a beaded or thickened edge 31 as distinguished from a rolled edge as in the form illustrated in Figures 1 to 3.

In that form illustrated in Figure 4 of the drawing, the protector is of the same construction as in the heretofore described form of the invention. In this form of the invention, however, the fastening means operates in a slightly different manner than in the heretofore described form.

Referring to Figure 4, it will be noted that the hooked end 22 of the bolt 21 functions as a head and engages the fender in such a manner that the fender will be clamped between said hooked end of the bolt and the outer wall 11, when the bolt is turned up, it being understood that in this form, the bolt will be threaded into the bushing 20 instead of freely slidable therein and that the wing nut 24 will be rigidly carried by the bolt.

In Figure 5, the body portion of the protector is slightly altered in that an ornamental member 35 is secured to the outer face of the wall 11 of the channel. This ornamental member 35, is formed preferably from metal and in addition to performing its ornamental function, it serves as the reinforcing element for the outer wall of the channel and although in Figure 5 I have not illustrated an embedded reinforcing element corresponding to the one designated 16 in the other forms of the invention, such a reinforcing element may be employed if desired in the form illustrated in Figure 5.

The protector being of relatively soft material such as described, it will be obvious that it will absorb all slight shocks, especially such as result from rubbing contact with other fenders or stationary articles without resulting in any damage to the fenders and will, in many instances, prevent marring or disfiguration of the finish of the article upon which it is mounted.

While the invention has been herein illustrated in its preferred forms, it is to be understood that it is not to be limited to the constructions herein illustrated and that it may be practiced in such other forms as fall within the purview of the appended claim.

Having thus described the invention, what is claimed, is:

A protector for the edge of a vehicle fender, comprising a body portion of relatively soft and semi-rigid material conformable to the shape of the edge of the element to be protected and having a channel for the reception of said edge, one of the side walls of said channel being wider than the other, a plurality of bushings enbedded in the narrower side wall of said channel member, a bolt carried by each of said bushings and extending through the bushing into engagement with the fender to which the protector is attached, and means for causing gripping engagement of the bolt with the fender to hold the protector in position on the fender, said means comprising a member threaded on each of said bolts and having engagement with its respective bushing.

ANDREW GROSS.